Feb. 15, 1966    H. R. FEHLING ETAL    3,234,771
METHOD FOR FORMING SMALL ARTICLES
Original Filed May 16, 1961    15 Sheets-Sheet 1
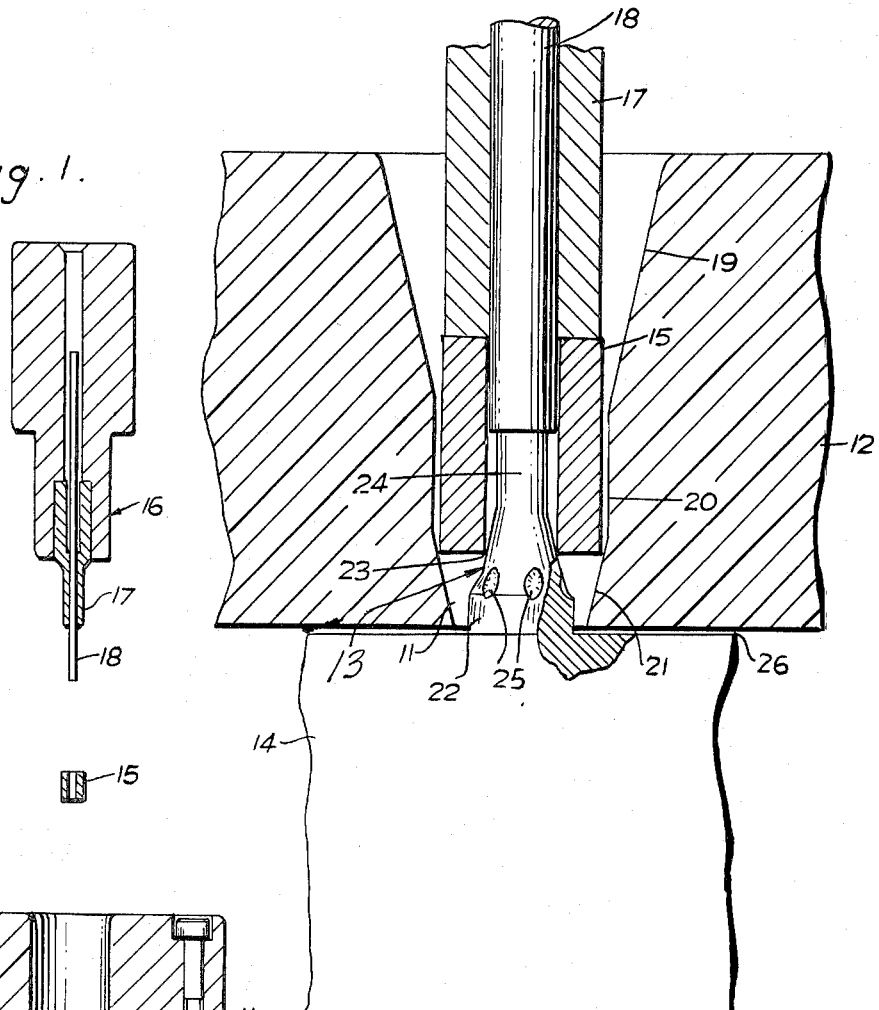
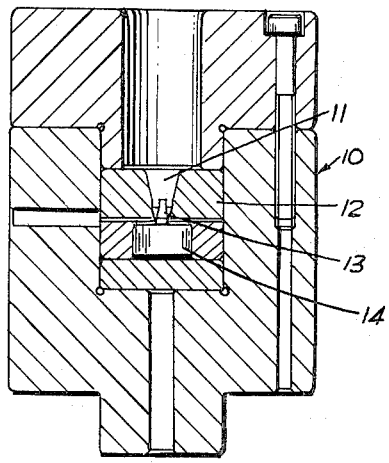
INVENTORS
HANS REINHARD FEHLING
EDWARD HENRY HARVEY
JAMES JOHN PATEMAN
ALFRED DENNIS STREET
BY
THEIR ATTORNEYS

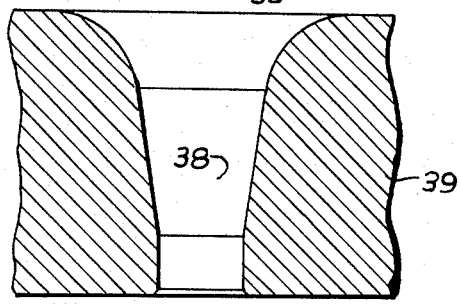
Fig 5.
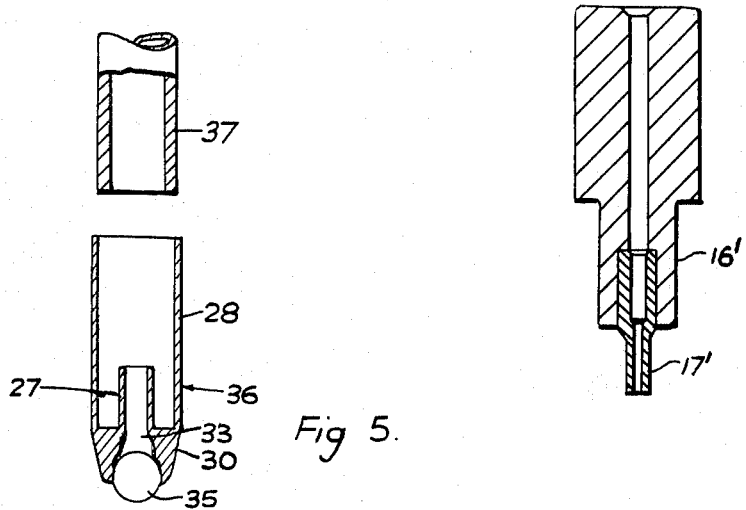
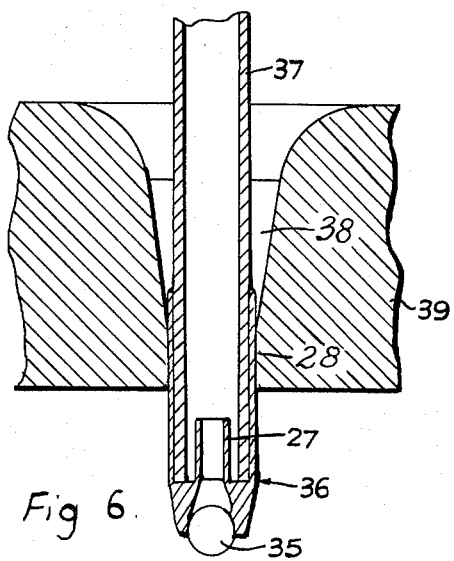
Fig 6.
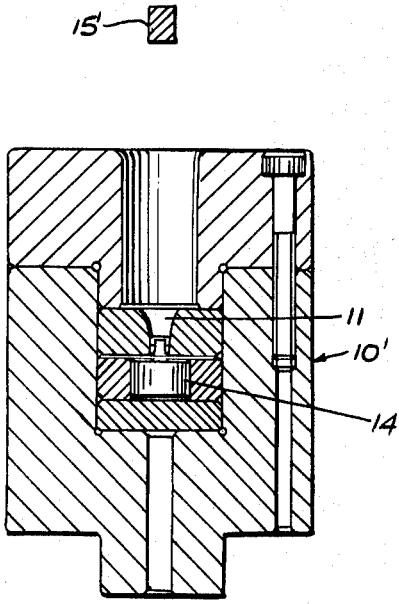
Fig 7

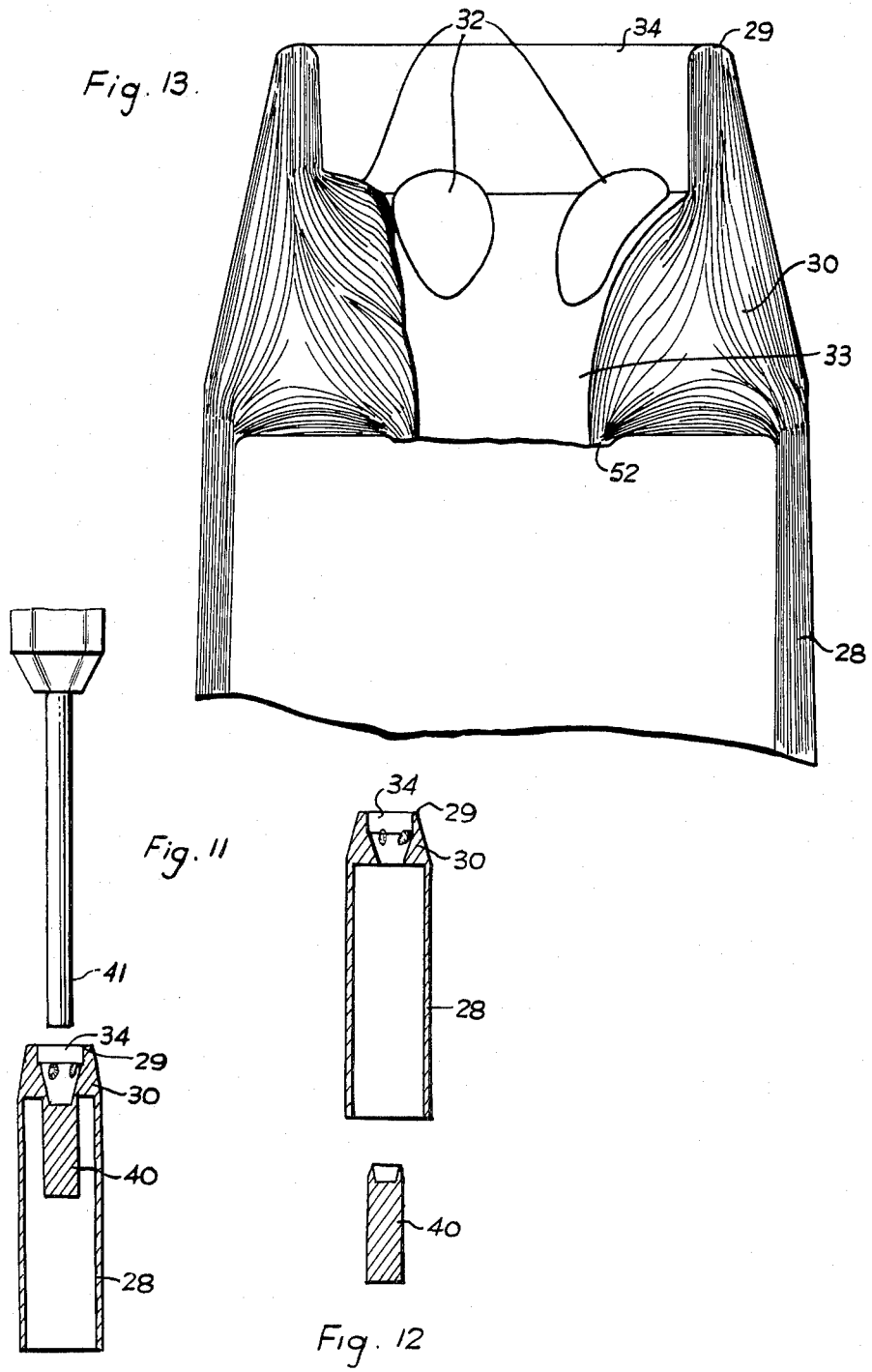

Feb. 15, 1966 H. R. FEHLING ETAL 3,234,771
METHOD FOR FORMING SMALL ARTICLES
Original Filed May 16, 1961 15 Sheets-Sheet 14

United States Patent Office 3,234,771
Patented Feb. 15, 1966

3,234,771
METHOD FOR FORMING SMALL ARTICLES
Hans Reinhard Fehling, Zug, Switzerland, and Edward Henry Harvey, London, James John Pateman, Harrow, and Alfred Dennis Street, Pinner, England, assignors to I.R.C. Limited, London, England, a company of Great Britain
Original application May 16, 1961, Ser. No. 110,518. Divided and this application Jan. 9, 1963, Ser. No. 250,278
Claims priority, application Great Britain, May 18, 1960, 17,484/60
12 Claims. (Cl. 72—256)

This invention relates to methods for making small articles such as housings for the writing extremity or nib of a ball point writing instrument, and more particularly, to a new and improved method for forming such articles. This application is a division of our copending application Serial No. 110,518, filed May 16, 1961 for "Nib Housing for Ball Point Writing Instrument."

In general, the nib for a ball point writing instrument comprises a housing having a ball socket at one end adapted to receive a writing ball of about one mm. diameter, an internal ink feed duct leading from the other end of the housing to the interior of the socket, and a plurality of part-spherical base seats formed at the rear of the socket to support the ball having ink passages between them which extend from the ink feed duct to an annular cavity surrounding the ball. Forwardly of the annular cavity an inturned lip provides a part-spherical lateral seat which retains the ball in the socket.

Heretofore, the housing for a ball point writing extremity has been formed by machining and punching operations which, because of the very small size of the workpiece and the very close tolerances involved, must be performed by relatively complex and highly accurate equipment. Moreover, the quality of the product made in this manner depends to a great extent on the skill of the tool setter.

Accordingly, it is an object of the present invention to provide a new and improved method for making small articles such as ball point nib housings which is characterized by high speed of operation and low cost of equipment.

Another object of the invention is to provide a method for making ball point nib housings of uniformly high quality which eliminates the influence of human factors.

These and other objects of the invention are accomplished by deforming a billet of ductile material under impact within a die assembly so that the billet is plastically deformed so as to assume the shape of the die cavity, the energy and speed of the deforming impact being great enough to generate sufficient heat in the billet to assure complete plastic deformation. In particular, a ball point nib housing is formed by driving a billet of suitable ductile material into a cup-shaped cavity which is vented at the bottom and bounded by a surface adapted to form the outside surface of the housing and includes a central pin rigidly projecting from the bottom of the cavity having a shape defining the inside surface of the ball socket in the housing so as to cause material from the billet to intrude forwardly into and fill the vented space between the central pin and the adjacent surface of the cup-shaped cavity.

The term "intrusion" as used herein defines a process by which a solid ductile material is forced into a vented cavity so as to assume the shape of the cavity. A suitable ductile material is a material, metallic or otherwise, which is capable of large permanent deformation without fracture and which, when deformed according to the present invention, has and retains sufficient hardness and strength to withstand the wear and tear to which a writing extremity is subjected under normal conditions of use.

In one embodiment of the invention a writing extremity housing is made by pressing a billet of a suitable ductile material into a die cavity defining the exterior of the housing by means of a punch which is driven against the billet by impact, but if desired, the punch may also be driven by a continuous application of force.

The higher the yield stress of the metal of the billet, the greater should be the speed of relative approach between the die and the punch. Slow pressing is possible with tin alloys but in fact a speed of not less than about 5 feet per second has proved to be essential for copper. At this speed the total duration of the deforming process is considerably shorter than the time required for the heat generated by the impact to leak away through the die walls. The billet should be self-centered in the die in that it touches the die walls prior to contacting the end face of the core pin, and the axis of symmetry of the billet coincides with the longitudinal axis of the die. The punch should be of plain cylindrical or stepped cylindrical form in preference to a forwardly tapered punch. Preferably, the cavity and the punch are arranged so that the distance between the face of the punch and the rim of the cup at the end of the punch stroke is not more than three times the diameter of the rim of the cup. In addition, the diameters of the punch and the adjacent cavity surfaces are selected so as to provide an escape path for the ductile material which has a width not greater than the thickness of the rim of the cup. As the billet is driven into the cavity by the punch, the work performed on the billet material raises the billet temperature by the conversion of mechanical energy into heat so that, at the last and most difficult stage of forming, in which a sleeve of the billet material is extruded rearwardly through the narrow escape path and about the punch to provide a mounting for the writing extremity housing on a reservoir tube, the material has a substantially reduced flow stress for large strains. The punch may be either solid or it may have a central passage, and the billet may be in the form of a sphere, a solid cylinder, or a cylinder with a central passage. Spherical billets have the advantage that they can be mass produced with extreme accuracy in volume and may readily be fed automatically from a hopper or the like to the apparatus in which they are deformed. Furthermore, the substantial difference between the shape of the billet and that of the final article assures that enough energy is absorbed during the first stages of deformation to reduce the flow stress of the material at large strains so that complete plastic deformation to conform accurately to the die shape occurs during the final stage of the process. Moreover, if the die is provided with a funnel-like entry, a ball large enough to sit in this funnel will automatically be centered in the die, thus insuring that the extruded sleeve is uniform in length. This uniformity avoids the necessity of any subsequent trimming operation on the free end of the sleeve. Punch length can thereby be kept to a minimum, thus eliminating the possibility of punch buckling.

Further objects and advantages of the invention will be apparent from a reading of the following description in conjunction with the accompanying drawings in which:

FIGURE 1 is a sectional view showing the tools (die and punch) and a hollow cylindrical billet;

FIGURES 2, 3 and 4 are sectional views on a larger scale illustrating successive stages in the billet deformation process;

FIGURES 5 and 6 are views illustrating a method of fixing the finished writing extremity to a reservoir tube;

FIGURE 7 is a view of modified tools and a solid cylindrical billet;

FIGURES 11 and 12 illustrate a method of detaching an extruded slug from a blank produced by these modified tools;

FIGURE 13 is a sectional view, on a greatly enlarged scale, showing the flow pattern in a blank according to this invention produced from a spherical billet;

FIGURES 21 and 22 illustrate the production of ink grooves in the base of the cup simultaneously with punching-out this diaphragm;

Figure 3:
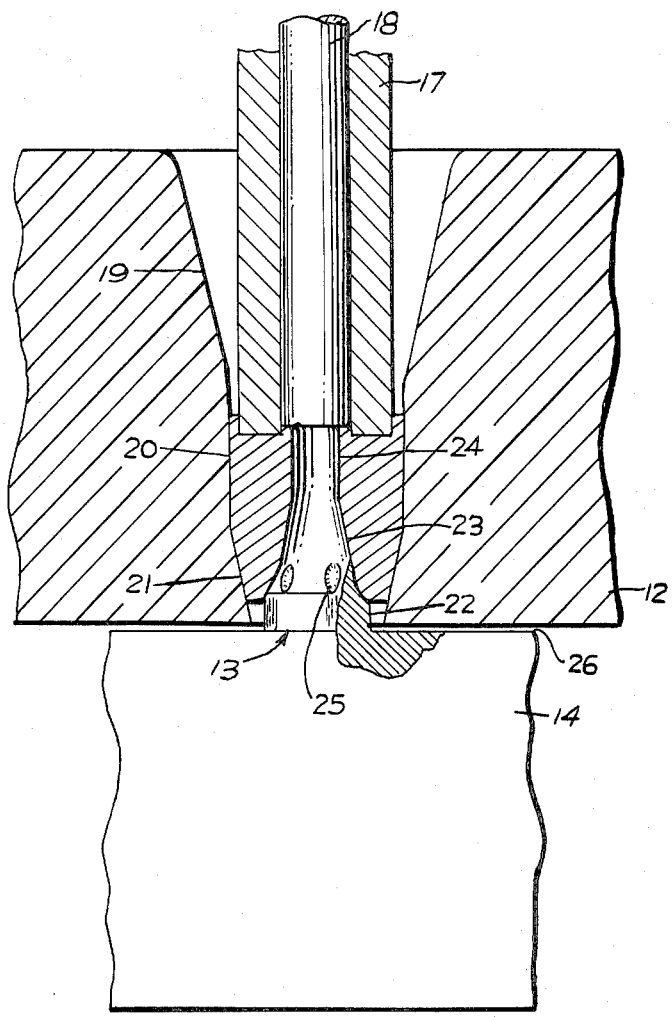

Turning to FIG. 1, the die 10 therein shown includes a cup-shaped die cavity 11 formed in a hollow member 12 and a central core pin 13 formed on a block 14 and protruding into the die cavity, the block 14 providing the bottom surface of the cavity. A hollow cylindrical billet 15 is deformed under pressure within this die cavity by means of a punch tool 16 comprising a hollow punch 17 slidably housing a pin 18 onto which the billet 15 may be threaded.

The shape of the die cavity 11 is best shown in FIG. 2. It has a funnel shaped entry 19 and comprises a parallel or almost parallel portion 20 and a tapered end portion 21. The tapered core pin 13 comprises a substantially cylindrical portion 22 attached to the block 14, a conical portion 23 and a substantially cylindrical end 24. Parts 22 and 24 may have a slight "draw." Part 22 forms the main cylindrical part of the cup (see 34, FIG. 13) and part 23 its base. Part 32 is also formed with circumferentially spaced depressions 25 for a purpose hereinafter described.

A particularly suitable material for the billet 15 is electrolytic copper, but other metals such as pure aluminium, silver, and certain tin alloys are also suitable. If desired, the billet 15 may be plated with, for example, silver, thus resulting in a plated blank.

The material should have an elasticity modulus of not less than $5 \times 10^5$ lbs./sq. in., and preferably of more than $10^6$ lbs./sq. in. Its yield stress in tension at the temperature of deformation according to the invention should preferably not exceed $5 \times 10^4$ lbs./sq. inches. The material should further be chemically compatible with an ink suitable for ball point pens.

The hollow billet 15 carried on the end of pin 18 is inserted in the cold state into the die cavity by approach movement between tools 10 and 16 being guided by the tapered mouth 19. FIG. 2 shows the stage at which the billet has been fully inserted but not compressed and the pin 18 has been arrested by the end 24 of the core pin.

It is preferred to carry out the method according to this invention by impact in a single operation rather than by the application of sustained pressure. It has been ascertained that whereas to produce a small copper blank according to the invention may require a sustained force on a punch of not less than 500 lbs. the same blank can be formed by a single impact of not more than 3 ft. lbs., e.g. by the drop of a 2 lb. weight from a height of 1.5 ft., because of the increase in billet temperature upon impact which reduces its flow stress for large strains as compared with the flow stress for the same strains at room temperature.

It has further been found that stresses in the order of 100 tons per square inch are generated when forging a copper billet into a blank according to this invention. This approaches the permissible working limit of tool steel. It is therefore important so to arrange matters that this working stress is not exceeded and to avoid misalignment between relative moving parts of the tool such as the die 12 and the punch 17, or variations in the size or shape of the billet 15. As pointed out above, dropping a weight from a given height gives an impact of defined total energy, and this results in an automatic limit on the energy input, thereby limiting the maximum stress to which the tool parts can be subjected. It is best to avoid any actual contact, or relative movement in contact, between the parts of the tool as would occur if there were a sliding fit between the die 12 and the punch 17. For this purpose it is preferred to provide a gap between the die and the punch and to permit the extrusion therethrough of any surplus material from the billet which is not trapped between die and punch. It is essential that at a stage in the deformation process the material will flow into and conform to the rim-defining volume of the die cavity. That is to say, at this stage it must be at least as easy for the material to flow into and fill the rim-defining volume surrounded by the die surface 21 as it is for the material to flow elsewhere. The conditions must be that at this stage the resistance to extrusion through the escape gap between the punch 17 and the die then existing is sufficiently high that the pressure prevailing in the material trapped in the die cavity is adequate to cause the material to flow into and fill the rim-defining volume.

The exterior of the housing surface formed by the cup is tapered down to the rim by an appropriate tapering of the die portion 21 surrounding the core pin portion 22, the thickness of the rim formed by these portions being preferably not more than 0.005" prior to the rim-constricting operation. Thus in the deforming process the material of the billet 15 must be caused to intrude into an annular cavity of decreasing width, which decreasing width gives rise to a resistance to that intrusion which would not occur were the material able to flow freely away from the pressurized zone as in conventional extrusion. It is thought that this is a reason why the distance between the punch face and the rim of the cup should be as small as possible when the pressing operation is completed. It has been ascertained that the greater this distance the greater is the force required to produce a well formed rim.

In operation, therefore, as the punch 17 advances in relation to the die as shown in FIG. 3., under an impact energy of 3 ft. lbs., for example, the billet 15 is deformed until it commences to intrude into the cavity 11 and conform to the interior shape of the die cavity and the exterior shape of the core pin 13 including the depressions 25. The material of the billet also commences to extrude rearwardly through the narrow annular escape gaps provided between the exterior of the punch 17 and the substantially cylindrical part 20 of the die and between the exterior of end part 24 of the core pin and the interior of the punch. Air which would otherwise be trapped in the die cavity escapes through a narrow vent 26 between parts 12 and 14. This vent is, for example, 0.001" wide.

Figure 4:
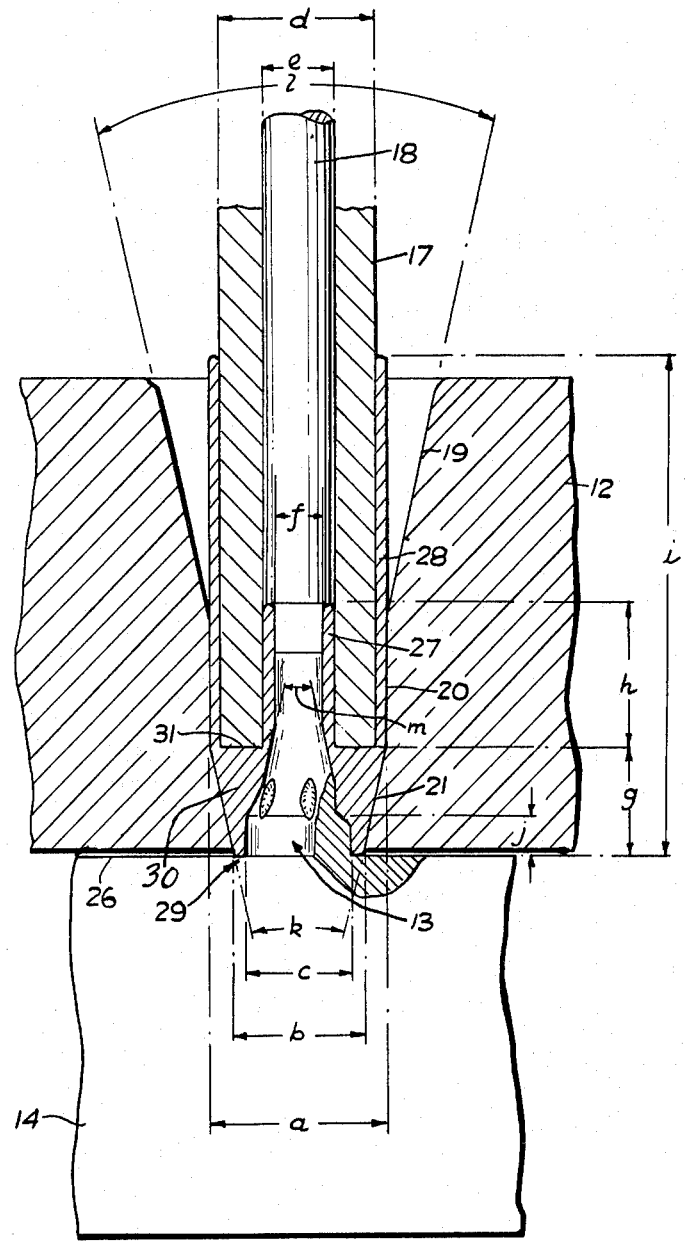
Figure 8:
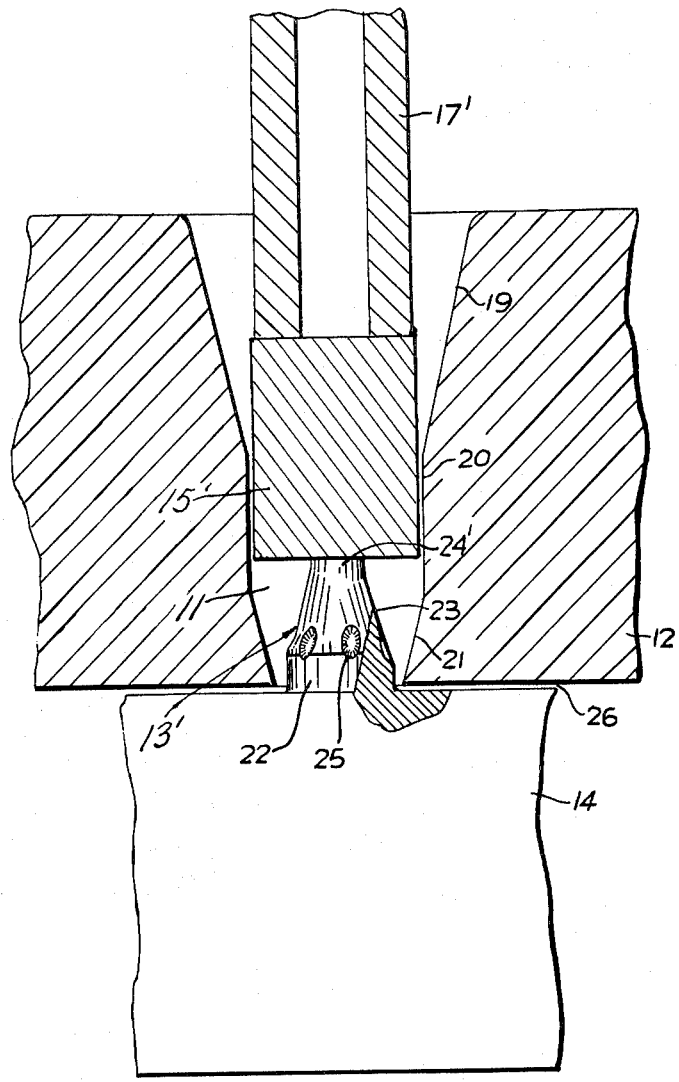
FIGURES 8, 9 and 10 are views similar to FIGS. 2, 3 and 4 and show stages in the deformation process using these modified tools.

The advance of the punch 17 continues until the final stage shown in FIG. 4 is reached. During this continued advance the ductile material continues to be extruded rearwardly around the end of the core pin and up the interior of the punch 17 and between the exterior of the punch and the interior of part 20 of the die as two tubular portions 27 and 28. As the inner sleeve 27 is gradually extruded it presses the pin 18 back into the punch 17. The ductile material is also intruded forwardly into the die cavity so that it completely occupies and conforms to the rim-defining volume of the cavity. As has already been explained this latter result is achieved by so arranging matters that the resistance to the rearwards escape of the material (i.e. to form, by extrusion, the tubular parts 27, 28) is sufficiently high. For this purpose at the final stage the width of the escape gaps between the conical exterior of the core pin and the inner front edge of the punch and the exterior front edge of the punch and the interior periphery of the die are narrower than the width of the lip 29 of the cup. This is apparent from FIG. 4 and from the dimensions given in the following table:

| | | | |
|---|---|---|---|
| a | 0.071" dia. | h | 0.051" dia. |
| b | 0.054" dia. | i | 0.195" dia. |
| c | 0.044" dia. | j | 0.015" dia. |
| d | 0.064" dia. | k | 26° |
| e | 0.028" dia. | l | 26° |
| f | 0.020" dia. | m | 26° |
| g | 0.042" dia. | | |

The billet 15 for use with tools having the specified dimensions may be 0.065" external diameter, 0.029" internal diameter, and 0.085" long. With these dimensions, application of 3 ft. lbs. of energy corresponds to an energy input of about 30 calories per gram so that, assuming no heat loss, the billet temperature is raised to about 350° C. causing a reduction of about 50 percent in the flow stresses of copper at a given strain (as measured by conventional tensile or compressive testing means). With an impact speed of the order of 5 feet per second the heat loss during deformation of a billet of this size is negligible and this temperature is, in fact, achieved, so that the maximum working stress, which is applied at the end of the stroke, is substantially reduced.

It will further be observed that at the final stage shown in FIG. 4 the distance between the punch face and the rim 29 of the cup is less than three times the cup diameter and, in fact, is slightly less than the diameter of the cup (as determined by the cylindrical part 22 of the core pin). Therefore the resultant blank comprises a socket-body portion 30 bounded at one end by the rim of the cup and at the other by an end face 31 (formed by the face of the punch), the distance between the rim 29 and the end face 31 being slightly less than the diameter of the cup. The sleeves 27, 28 protrude rearwards from this end face and the wall thickness at least at their roots (i.e. where they connect with the part 30) is not greater than the thickness of the rim of the cup. It may be added that if the dimensions of the tool are such that the initial stages of rearwards extrusion of the sleeve 28 (see FIG. 3) take place before the face of the punch has advanced beyond the small end of the tapered entry 19 of the die the free end of sleeve 28 may be somewhat thicker than its root.

The depressions 25, being filled with the deformed material, produce on the conical end face of the cup high spots or pimples such as are best shown at 32 in FIG. 13. The end parts of the core pin 13 produce a feed duct, indicated generally at 33 in FIGS. 5 and 13, leading to the cup 34.

The completed housing is extracted from the die, for which purpose the portion 20 thereof may have a slight "draw." Either before or after removal of the blank from the punch a ball, which may be the writing ball 35 or another ball, is inserted into the cup and pressed against the pimples 32 so as to indent them with part-spherical base seating surfaces. The rim 29 of the cup is deformed around the ball so as to produce a known part-spherical lateral seat above the ball equator and desirably below it also. This part-spherical lateral seat is separated from the base seats (in known manner) by an annular ball-encircling cavity with which the feed duct communicates by way of the spaces between the pimples 32.

The completed writing extremity is illustrated at 36 in FIG. 5.

The foregoing operations of forming the blank and of completing the formation of the writing extremity can be carried out in a continuous sequence on a multi-stage machine such as a machine of the turn-table or turret type. Indeed, the operations on the formed blank may be carried out without removing the latter from the punch.

The sleeve 28 forms a useful means by which the writing extremity can be fixed to a feed tube (or "adaptor") 37 by which the writing extremity may be connected to an ink reservoir tube and suitable operations for this purpose are shown in FIGS. 5 and 6.

The tube 37, having an external diameter about the same as the internal diameter of sleeve 28, is inserted into the latter and the writing extremity pushed by the tube through a hole 38 in a die 39 as shown in FIG. 6. The hole 38 tapers to a small diameter which is slightly less than the exterior diameter of sleeve 28 so that as the writing extremity is pushed through the hole the sleeve is squeezed or swaged onto the tube and the writing extremity is firmly fixed in position.

The modified tools 16' and 10' shown in FIGS. 7–10, wherein the various parts corresponding to those of FIGS. 1–4 but not identical therewith are indicated by primed reference numerals, are primarily intended for use in forming a housing blank from a solid cylindrical billet 15' and it will be seen that although the punch 17' is hollow the central pin such as 18 is not provided. Moreover, the cylindrical end 24' of the core pin 13' is shorter than the end 24 of core pin 13.

Figure 9:
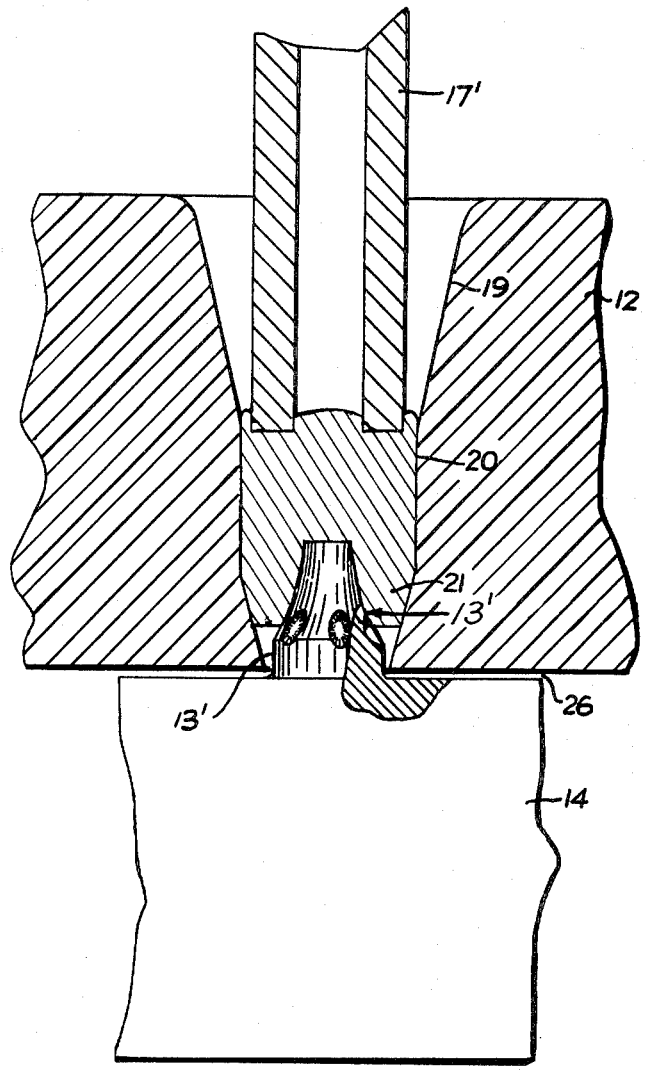
Figure 10:
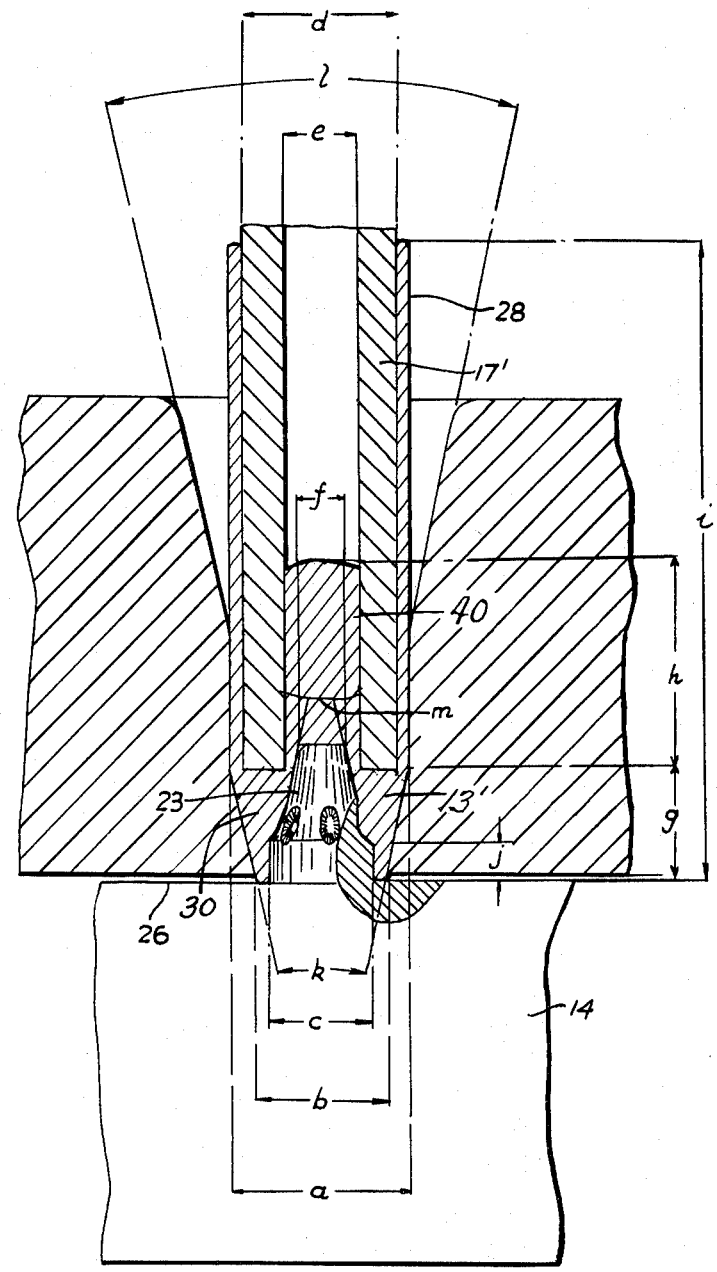

It will be seen from FIG. 9 that as the punch 17' advances (impact energy 3 ft. lbs.), not only is the material extruded around the punch in the incipient formation of sleeve 28 but it is also extruded up the hollow punch. The result shown in FIG. 10 is that a slug of metal 40 is extruded up the interior of the punch. At the final stage the inner edge of the punch end is extremely close to the periphery of the conical part 23 of the core pin 13' such that the annular escape gap here afforded is less in width than the rim 29 and is indeed so narrow that the slug 40 is united to the socket-body portion 30 by a very thin and frangible annulus so that the slug may easily be broken off at a later stage.

The dimensions of the modified tools and of the resulting blank are identical with those given in the foregoing table except that dimensions h, and i are as follows:

| | |
|---|---|
| h | 0.083" |
| i | 0.250" |

The billet for use with tools having these specified dimensions my be 0.070" diameter and 0.085" long. Application of 3 ft. lbs of energy to this billet corresponds to an energy input of about 20 calories per gram and, assuming no heat loss, this raises the billet temperature to about 250° C., thereby reducing by about 35 percent the flow stresses of copper at a given strain as compared with that at room temperature (as measured by convential tensile or compressive testing means). In fact, at impact speds of 5 feet per second or more, the deformation of a billet having these dimensions takes place within 0.02 second so that practically no heat is lost and the billet temperature does reach this value at the final forming stage.

The separation of the slug 40 from the blank is illustrated in FIGS. 11 and 12 and is effected by forcing a punch 41 down through the cup 34 into contact with the root end of the slug so that the latter is snapped off. It may be carried out while the blank is still on the punch.

The operations for completing the manufacture of the writing extremity from the blank thus produced and for the attachment of the writing extremity to a feed tube or adaptor may be identical with those already described.

The fabrication of a housing blank in accordance with the invention imparts certain unique properties and characteristics not present in nib housings made in the conventional manner and among these are the following:

(1) Neither the core pin nor the punch cuts into the billet material. Instead, the billet behaves as though it had an extremely tough skin (which in fact it has not) into which the two tools cannot "cut" because they are too "blunt." In other words, the surface layer of the billet into which the core pin, for example, plunges is elongated and stretched, and "wraps" itself round the pin like a "stressed skin." Consequently, a surface coating on the billet will appear on both the interior and exterior surfaces of the resultant blank.

(2) The strongest work hardening of an originally annealed metal billet occurs in the surface layers of the metal in contact with the punch and the pin. This is, of course, very favorable as these surface layers are those subjected to the wear produced by the rotation of the ball in the finished nib.

(3) There is very little shear along the conical die surface defining the exterior of the nib.

By sectioning a blank according to this invention and polishing and etching the sectioned surface in known manner, the flow pattern of the material is shown up and affords clear evidence of the above-mentioned characteristics and of way in which the blank has been made. A typical flow pattern is illustrated in FIG. 13. The blank illustrated in FIG. 13 is produced by the cold deformation of a solid spherical copper billet in the manner of FIGS. 14–17 but the flow pattern in a blank produced from a solid, or hollow, cylindrical billet will not vary greatly therefrom. The drawing shows the line of fracture 52 at which slug 40 has been broken off.

It will be observed that the grain flow lines in the material forming the peripheral surface of the cup extend substantially parallel with the interior surface of the cup 34, indicating that the billet has been intruded forwardly into the cavity. This results from the fact that during the intrusion process the surface layer of the billet is elongated and stretched over the core pin without rupture. Similarly, the grain flow lines indicate lateral extrusion in the area surrounding the ink feed duct 33 and rearward extrusion in the sleeve 28.

FIGS. 14–17 inclusive illustrate the production from a spherical billet 15″ of a blank, for a writing extremity, having an integral sleeve into which a reservoir tube may be fitted. The elements shown in these drawings which are similar to the elements of the previously described embodiments but not identical therewith are identified by double-primed reference numerals. The socket-body portion 30 for the blank is substantially identical with that described in the foregoing examples but the parts of the blank rearwards of portion 30 differ from the foregoing examples.

The female member 12″ in which the die cavity is formed has a funnel-shaped entry 19″, a parallel portion 20″, and a tapered end portion 21″. The core pin 13 is substantially as in the foregoing examples as is also the shape and size of that portion of the tapered part 21″ which surrounds the core pin. Punch 17″ is hollow, having a hole 42 through its operative face leading to a clearance hole 43. The dimensions in which the tools differ from the foregoing examples are (FIG. 17) $l=30°$, $n=0.128″$ dia., $o=0.024″$ dia., $p=0.440″$ dia., $q=0.200″$ dia. and $r=0.148″$ dia. The billet 15″ (FIG. 14) is 0.156″ diameter and the impact energy is 40 ft. pounds. Application of 40 ft. lbs. of energy to a 0.156″ dia. billet corresponds to an energy input of 45 calories per gram and, assuming no heat loss, this would raise the billet temperature to more than 400° C., thereby reducing by at least 65% the flow stresses of copper at a given strain as compared with the value at room temperature (as measured by conventional tensile or compressive testing means). With a 5 foot per second impact speed, heat loss from the billet during the deforming operation is negligible and the billet temperature does reach 400° C. at the final forming stage.

Figure 14:
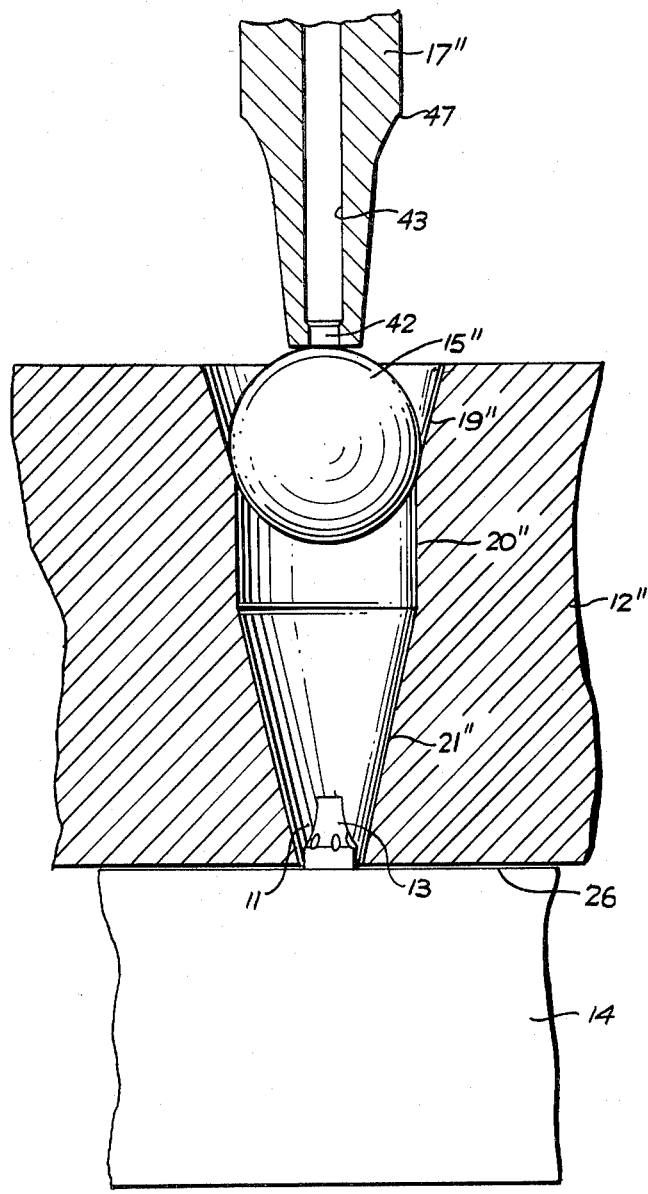
FIGURES 14 to 17 show the tools for, and successive stages in the manufacture of, a further modified blank.
Figure 15:
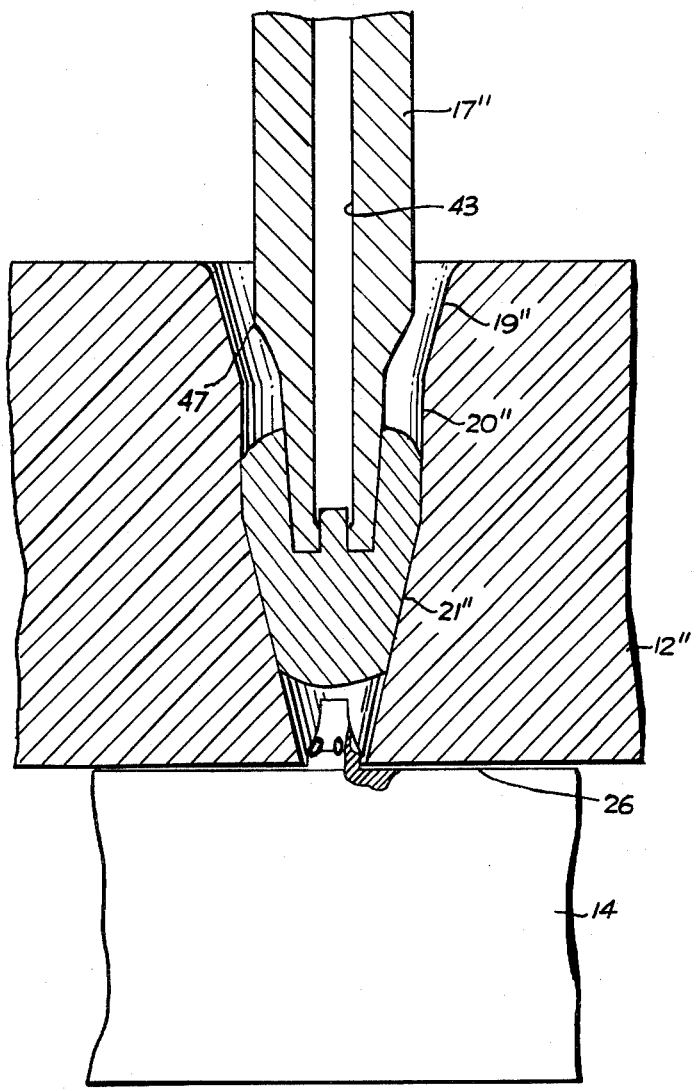

As shown in FIG. 14, the spherical billet 15″ fits in and is accurately centered by the entry funnel 19″. As the tool 17″ advances the billet is forced downwards in the die cavity and a part of its material is extruded rearwards around the tapered front end of the punch and through the hole 42 in the punch. FIG. 15 illustrates a stage at which the work done is about 10 ft. lbs. Inasmuch as about one quarter of the total impact energy is absorbed by the billet in this initial deforming stage, the temperature of the billet material has been raised appreciably so as to reduce the flow stress of the material sufficiently to accomplish the subsequent and more difficult billet deformation.

Figure 16:
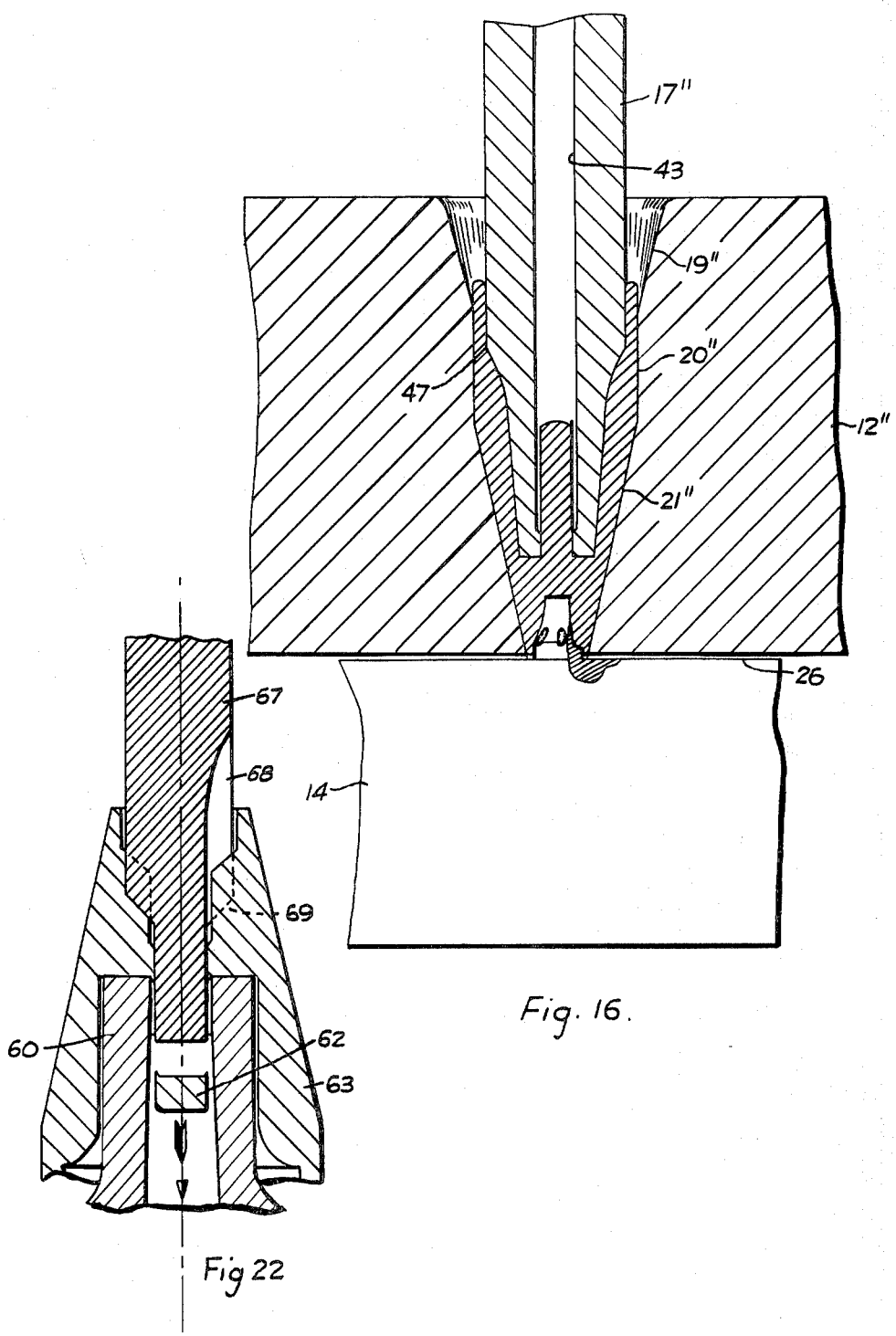
Figure 17:
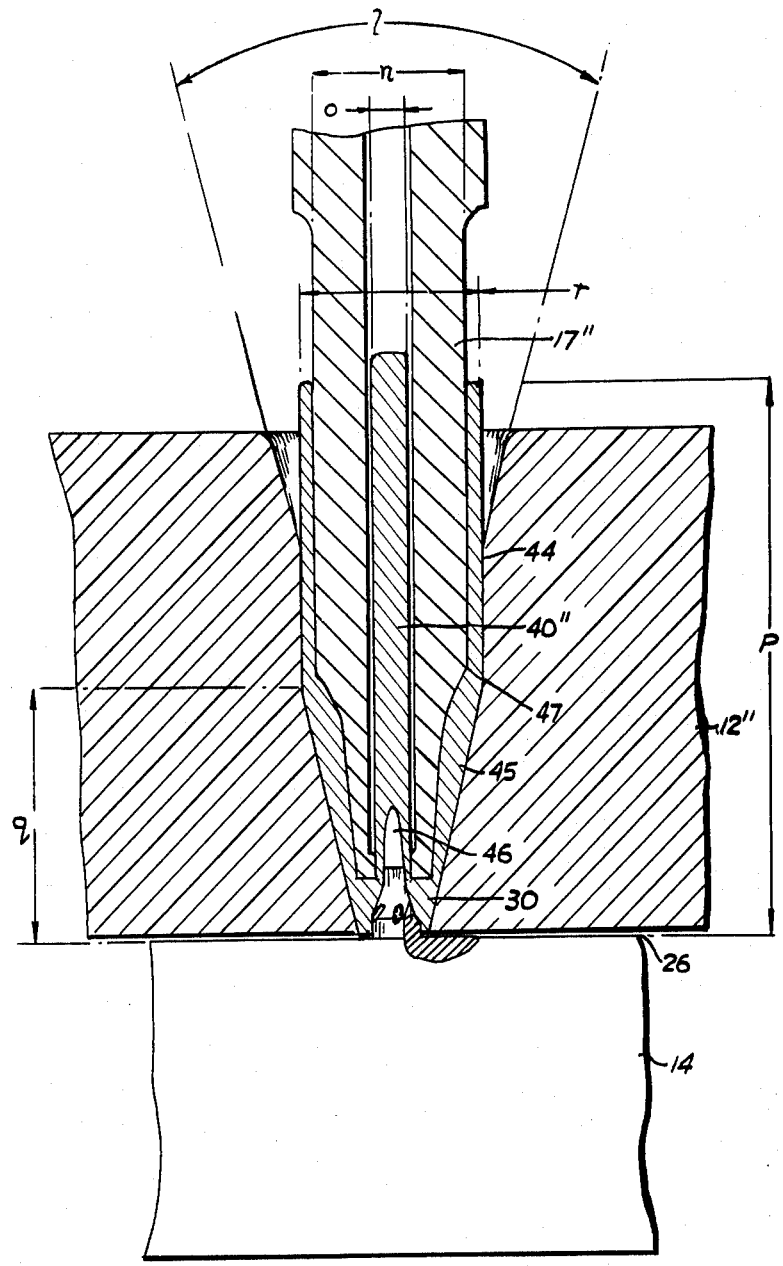

FIG. 16 illustrates a subsequent stage at which the work done is about 20 ft. lbs. and the billet has been further heated by plastic deformation, and it will be seen that the rearward extrusion through and around the punch and the forward extrusion into the socket-body forming portion of the die cavity has progressed. FIG. 17 illustrates the final stage in which the work done is 40 ft. lbs. and the billet material has reached its maximum temperature. The blank is completely formed and around the punch 17″ there is a complete sleeve 44 connected by a hollow conical part 45 to the portion 30. Inside the punch there is an extruded slug 40″ the lower end of which is hollow as at 46 so that the slug is connected to the portion 30 by a thin annular part permitting it readily to be broken off.

It will be observed that at the final stage the distance between the face of the punch and the rim of the cup is substantially the same as the diameter of the cup. However, the escape gaps which, during the deformation process, present themselves between the outer edge of the front face of the punch and the tapered part 21″ of the die, and between a shoulder 47 on the punch and part 20″, are greater than the width of the rim of the cup. Matters are however so arranged that, in the final stages, the resistance to extrusion through the escape gaps is sufficiently high to produce in the die cavity the pressure required to form the narrow rim of the cup. It will be understood that in this example, as in the previous examples, air escapes through the vent 26 and matters are so arranged that this vent is of an adequate size.

It will be noted, by comparison of FIG. 14 with FIG. 17, that the initial shape of the billet is substantially different from the shape of the finished article. Consequently, as shown in FIG. 15, considerable plastic deformation is required, generating a substantial quantity of heat in the initial deforming stages, thereby assuring a sufficient reduction in the flow stress of the billet material to permit complete conformation of the billet to the die shape during the final deforming stage and to prevent excessive stress on the die and punch.

The operations needed to form a completed writing extremity from the blank thus produced are substantially similar to those already described, and it will be appreciated that areservoir tube of capillary bore may be inserted directly into the sleeve 44 and the latter crimped or squeezed around the tube to fix the writing extremity and reservoir firmly together.

Figure 18:
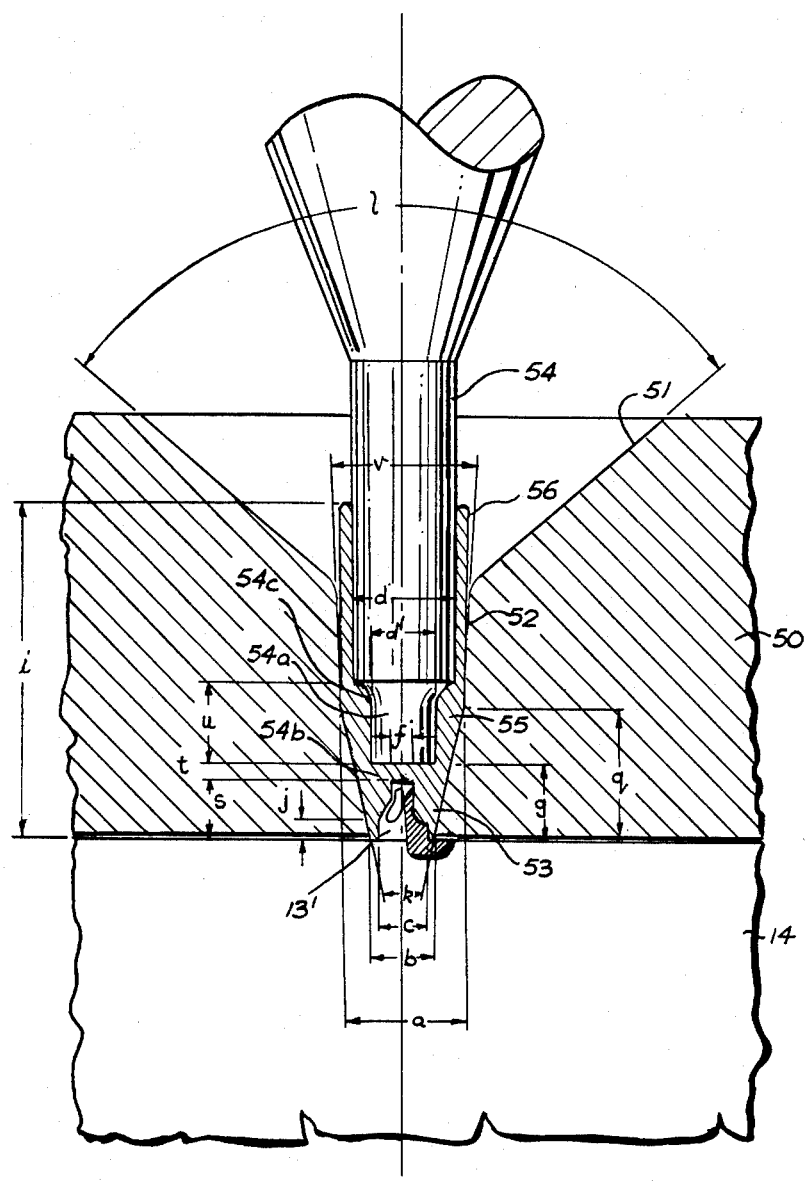
FIGURE 18 shows the final stage in the forging of a further modified blank, from a spherical billet and using a solid punch.

In the foregoing examples the tool incorporates a hollow punch. FIGURE 18 shows the final stage in the forging of a blank 55 from a spherical billet, using a solid punch 54. The die 50 in general resembles the die already described and illustrated. It has a funnel-shaped entry 51 which serves to centre the spherical billet, leading to a substantially parallel part 52 (having a slight draw) which leads to a tapered end portion 53. The cup-forming core pin 13′, being smaller than the small end of the die cavity, protrudes into the latter from the block 14, an air vent 26 being provided.

The punch 54 is of stepped cylindrical form having a leading end 54a of reduced diameter terminating in a flat end face 54b.

The dimensions in FIGURE 18 are as follows:

| | | | | |
|---|---|---|---|---|
| a | .100″ dia. | j | | .015″ |
| b | .050″ dia. | k | | 26° ind. |
| c | .043″ dia. | l | | 100° ind. |
| d | .086″ dia. | q | | .110″ |
| d′ | .055″ dia. | s | | .045″ |
| f | .020″ dia. | t | | .013″ |
| g | .058″ dia. | u | | .065″ |
| i | .265″ | v | | 5° ind. |

As the punch 54 descends it forces the spherical billet from the entry funnel 51 into the portion 52 of the die and thereafter causes the material of the billet to intrude into the tapered portion 53 so as to fill it and to extrude rearwardly around the punch as an exterior sleeve 56. During this deformation the material of the billet is in effect wrapped over the core pin 13′ without rupture of its surface layer, as a result, a coating or plating on the surface of the billet appears on both the interior and exterior surfaces of the housing blank. Also, the escape gap between the shoulder 54c of the punch and the part 52 of the die cavity is sufficiently narrow as to impose such resistance to the rearward extrusion of the sleeve 56 through said gap that the pressure developed in the die cavity is adequate to ensure that the narrow rim of the cup is fully formed. It will be noted that the draw of the part 52 causes this gap to diminish in width as the punch 54 advances with the result that the free end of sleeve 56 is somewhat thicker than its root. Due to the absence of that internal extrusion which takes place rearwardly up to the interior of a hollow punch, the solid punch has the advantage that it develops the full die pressure to form the narrow rim of the cup at an earlier stage in its descent. Hence well defined rims can be forged with the end face 54b of the solid punch stopping short of the end face of the core pin 13′ and within a distance from the rim corresponding to about 2.5 to 3 times the diameter of the cup. In the example illustrated in FIGURE 18 the distance is 1.35 times the diameter of the cup.

Figure 19:
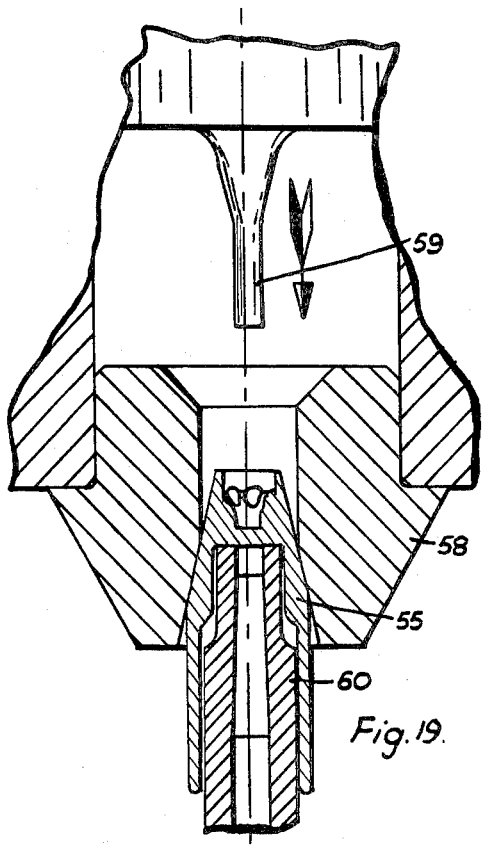
FIGURES 19 and 20 illustrate two successive stages in punching out a diaphragm of metal left at the base of the cup in the blank shown in FIGURE 18.
Figure 20:
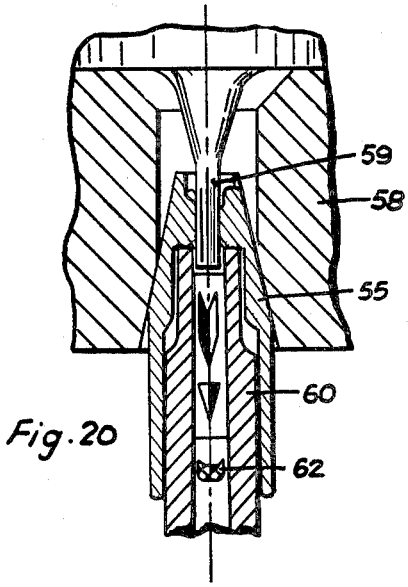

It will be apparent that with such an arrangement a thin diaphragm of material is left between the end face 54b of the punch and the end face of the core pin 13′. This diaphragm may be about 0.010 inch to 0.015 inch thick; in the example of FIGURE 18 it is 0.013 inch thick. It requires to be removed subsequently, e.g. by punching it out, and the tool for this operation is shown in FIGURES 19 and 20. It consists of a chuck 58 for centering the blank 55, a punch 59, and a hollow anvil 60 which enters the interior of the blank and supports the latter against the action of the punch. The bore 61 of this anvil is slightly greater in diameter than the punch 59 so that as the punch descends the diaphragm is punched out down the interior of the anvil as shown at 62 in FIGURE 20.

In all the arrangements so far described the core pin is provided with a circumferentially-spaced series of depressions or pimples so that, at the bottom of the cup, spaced mounds are produced on which the circumferentially-spaced base seats may subsequently be impressed, these base seats being divided by radial ink-feed channels constituted by the spaces between the mounds.

Figure 21:
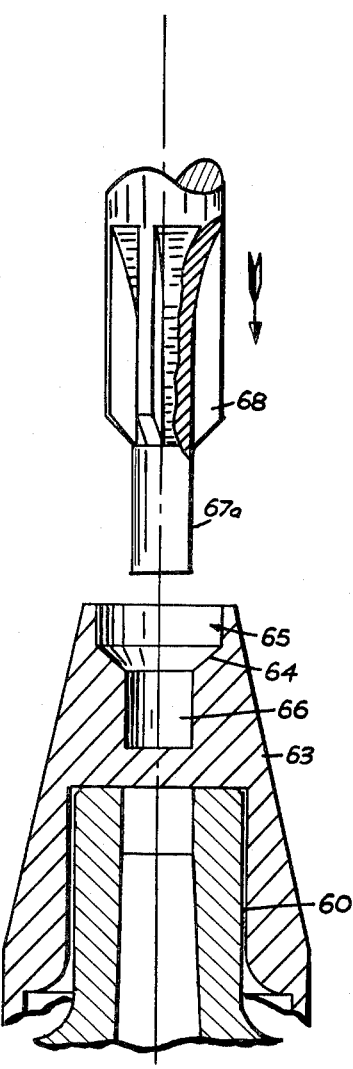

As an alternative, a plain core pin may be used instead of a dimpled one and the ink-feed channels produced at a subsequent operation. This is illustrated in FIGURES 21 and 22. The blank 63 shown therein resembles the blank 55 shown in FIGURE 18 except for the absence of mounds in the tapered lower part 64 of the cup 65 which leads to a rudimentary blind-ended central feed duct 66. The punch 67 has a plain end 67a for punching out the diaphragm 62 (see FIGURE 22) down the interior of the anvil 60, but it is also provided with a series of flutes 68 which in the final stages of the punching-out operation indent radial ink channels 69 into the base of the cup.

The blank herein described is work-hardened during the forming operation. As previously mentioned, the strongest work-hardening of the originally-annealed billet material occurs in the surface layers of the metal in contact with the punch and the core pin, and this is advantageous because those surface layers which contact with the core pin are those which, in the finished writing extremity, are subjected to the wear produced by the rotation of the writing ball.

Figure 23:
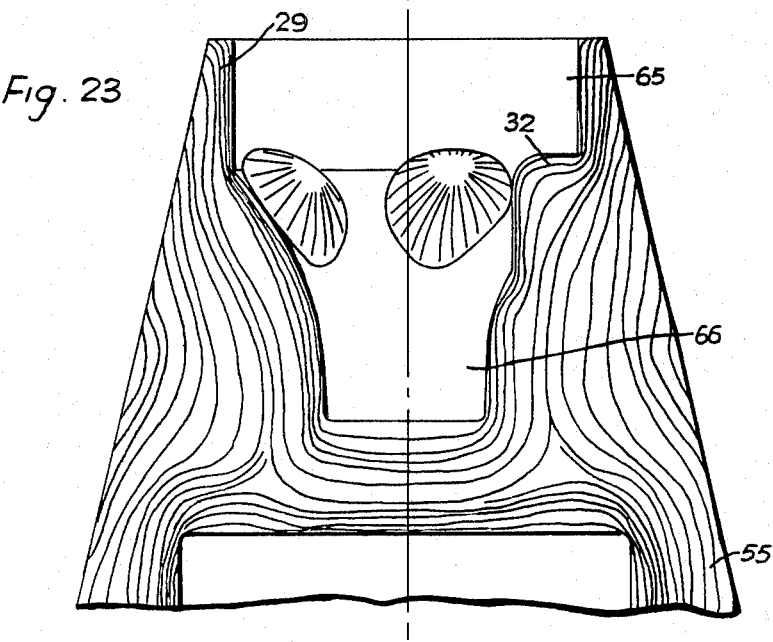
FIGURE 23 is a view on a greatly enlarged scale, of a sectioned and etched blank according to FIGURE 18, showing the macro-structure with the grain flow lines.

This work-hardening around the core pin takes place without rupture of the surface layer of the billet material as has already been discussed with reference to FIGURE 13. FIGURE 23, is a section through a forged copper blank 55 produced by the use of a solid punch as in FIGURE 18, showing the etched macro-structure with the grain flow lines. It will readily be apparent that because of the forward intrusion of the billet material, the grain flow lines extend substantially parallel with the interior surfaces of the said rudimentary duct 66, the mounds 32, and the cup 65. Lateral extrusion is indicated at the base of the ink feed duct and rearward extrusion in the mounting sleeve.

Figure 24:
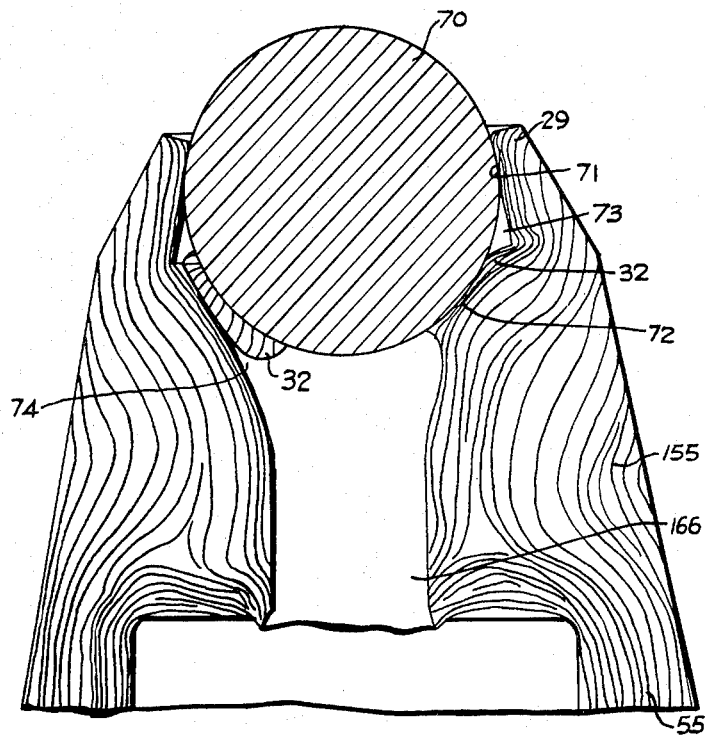
FIGURE 24 is a similar view showing the grain flow pattern in the finished writing extremity.

FIGURE 24 is a view similar to FIGURE 23 but showing the end part of the completed writing extremity with the writing ball 70 in position.

After the rudimentary feed duct 66 has been completed by punching out the diaphragm 62, thereby forming a complete feed duct 166, a ball which may be the writing ball 70 or similar ball is inserted into the cup 65 and rests on the mounds 32. Thereafter the rim 29 of the cup is permanently constricted around the inserted ball by the application of a suitable tool such as for example a conical die. This causes the interior of the cup to conform to the ball surface and produces a part-spherical lateral seat 71 extending around the ball which lateral seat extends above the ball equator as shown and may extend below it also. Simultaneously the ball is pressed down upon the mounds 32 so that each of them is impressed with a part-spherical base-seating surface 72. These surfaces 72, constituting a base seat, are spaced apart circumferentially and between them ink feed channels 74 extend radially outwards from the end of the feed duct 166 to an annular ball-encircling cavity 73 which is disposed between the lateral seat and the base seat. The disposition of the flow lines of the work-hardened seating surfaces 71 and 72 will be observed.

It will be readily apparent from the foregoing that the present invention provides an improved method of making small articles such as nib housings by reason of the following unique features. The entire article is substantially completely formed in a single operation, preferably under impact, i.e. under high compressive stresses of defined total energy in a die enclosure, the impact being of sufficient energy and rapid enough to heat the billet material to a temperature at which its flow stress is reduced. Preferably, the billet shape is sufficiently different from that of the final article so that a substantial proportion of the impact energy is absorbed during the initial forming operation. In the case of a nib housing, the die enclosure consists of a conical die having a surface defining the exterior of the blank in rigid and strictly concentric assembly with a central core pin (defining the interior of the cup) and a substantially cylindrical punch (defining the transverse end face at the rear of the central feed duct). This die enclosure has at least two openings, viz: an annular, rearward escape path for the metal around the punch, and an air vent at the forward end of the narrow annular cavity defining the rim of the cup. The openings or escape paths of the die enclosure are so narrow that the resistance they create to the extrusion of metal through them from the die enclosure is sufficiently high to produce in the latter the pressure required to form the narrow rim of the cup. The distance between the end face of the punch and the rim of the cup, at the end of the forming stroke, is not more than 3 times, and preferably 1 to 1.5 times the cup diameter.

Although the invention has been described herein with reference to specific emobdiments, many modifications and variations therein will readily occur to those skilled in the art. Accordingly, all such variations and modifications are included within the intended scope of the invention as defined by the following claims.

We claim:
1. A method of forming a small article having a recess, the article including an outside surface and an inside surface, comprising placing a billet of suitable ductile material into a generally cup-shaped die cavity vented at the bottom and bounded by a surface adapted to form the outside surface of the article and having a central core member rigidly mounted in the die forming the cavity, the core member projecting from the bottom of the cup-shaped cavity and having a shape defining the inside surface of the recess socket, and driving an elongated member which is coaxial with the central core member against the billet toward the bottom of the cup-shaped cavity to cause material from the billet to intrude forwardly into and fill the vented space between the central core member and the adjacent surface of the cup-shaped cavity.

2. A method according to claim 1 including the step of driving the elongated member against the billet by impact at a speed of at least a few feet per second.

3. A method according to claim 1 including the step of driving the elongated member against the billet by a continuous application of force.

4. A method according to claim 1 including the step of driving the elongated member against the billet within a surrounding cavity surface of slightly greater dimension than the elongated member thereby causing the billet to extrude rearwardly and form a tube surrounding the elongated member.

5. A method according to claim 1 wherein the surface of the die cavity comprises a lower conical cavity portion, an intermediate generally cylindrical portion extending upwardly from the conical portion and an upper portion, and the elongated member has a cylindrical shape with a diameter slightly smaller than that of the cylindrical surface portion of the cavity and including the step of driving the punch to a point within the cylindrical surface portion so as to provide a narrow annular escape passage for the billet material.

6. A method according to claim 1 wherein the elongated member has an end face and including the step of driving the end face of the elongated member to a point within the die the distance of which from the bottom of the cavity is no more than three times the diameter of the central core member at the bottom of the cavity.

7. A method according to claim 1 wherein the billet has the shape of a short cylinder, the elongated member has a forward face and the central core member has an end within the cavity, and including the step of inserting the billet into the die cavity so that one of its end surfaces is placed in contact with the end of the projecting central core member and the other end surface is presented to the forward face of the approaching elongated member.

8. A method according to claim 1 wherein the billet has the shape of a short cylinder with an axial passage and the elongated member comprises a tube having a central pin member slidable therein and including the steps of first threading the billet on the pin member of the elongated member and then inserting the pin and billet into the cavity so that one end of the billet extends between the central core member of the die and the adjacent cup-shaped cavity surface.

9. A method according to claim 1 wherein the cup-shaped cavity has a generally conical upper portion with a diameter decreasing from a value greater than a selected diameter to a value less than the selected diameter and including the step of inserting a spherical billet having the selected diameter into the upper portion of the cavity so that the billet is centered in the die cavity.

10. A method according to claim 1 wherein the die cavity is vented in a direction transverse to the direction of motion of the elongated member and including the step of withdrawing the small article from the die in the direction opposite to the direction of motion of the elongated member, thereby shearing off any flash which has been formed in the vents.

11. A method of forming a housing for the writing extremity of a ball point writing instrument, the housing having an outside surface and a ball-receiving socket, comprising placing a billet of suitable ductile material into a generally cup-shaped die cavity which is vented at the bottom and bounded by a surface adapted to form the outside surface of the housing and having a central pin rigidly mounted in the die cavity, the pin projecting from the bottom of the cup-shaped cavity and having a shape defining the inside surface of the ball-receiving socket, the billet having a perimeter which is smaller than the largest perimeter of the cup-shaped cavity but larger than the smallest perimeter thereof so as to be self-centering therein, and driving an elongated punch, which is coaxial with the central pin and which has an end face, against the billet and toward the bottom of the cup-shaped cavity by impact at a speed of at least a few feet per second until the end face of the punch is spaced from the bottom of the die cavity by a distance no greater than three times the diameter of the central pin at the bottom of the cavity to cause material from the billet to intrude forwardly into and fill the vented space between the central pin and the adjacent surface of the cup-shaped cavity.

12. A method according to claim 11 wherein the cup-shaped cavity has a generally conical upper portion with a diameter decreasing from a value greater than a selected diameter to a value less than the selected diameter and including the step of inserting a spherical billet having the selected diameter into the upper portion of the die cavity so that it is centered in the die cavity.

References Cited by the Examiner
UNITED STATES PATENTS

| | | | |
|---|---|---|---|
| 1,024,840 | 4/1912 | Ehrhardt | 207—10.5 |
| 1,482,697 | 2/1924 | Orr | 207—10.5 |
| 2,756,876 | 7/1956 | Watson et al. | 207—6 |
| 2,864,157 | 12/1958 | Camprubi | 29—556 |
| 2,904,173 | 9/1959 | Braun et al. | 207—6.1 |
| 2,966,987 | 1/1961 | Kaul | 207—10.5 |
| 3,093,890 | 6/1963 | Sparks | 207—10 |
| 3,110,953 | 11/1963 | Messerschmidt | 29—534 |

FOREIGN PATENTS

| | | |
|---|---|---|
| 523,104 | 4/1931 | Germany. |
| 934,265 | 10/1955 | Germany. |
| 794,578 | 5/1958 | Great Britain. |

OTHER REFERENCES

Pearson and Parkins: The Extrusion of Metals, 2nd ed., John Wiley & Sons, Inc., New York, 1960.

Metals Handbook, published by the American Society for Metals, 1948 ed., p. 876.

CHARLES W. LANHAM, *Primary Examiner.*

MICHAEL V. BRINDISI, *Examiner.*

E. D. O'CONNOR, H. D. HOINKES,
*Assistant Examiners.*